J. R. ARMSTRONG.
GAS METER.
APPLICATION FILED DEC. 9, 1919.
1,342,886.
Patented June 8, 1920.
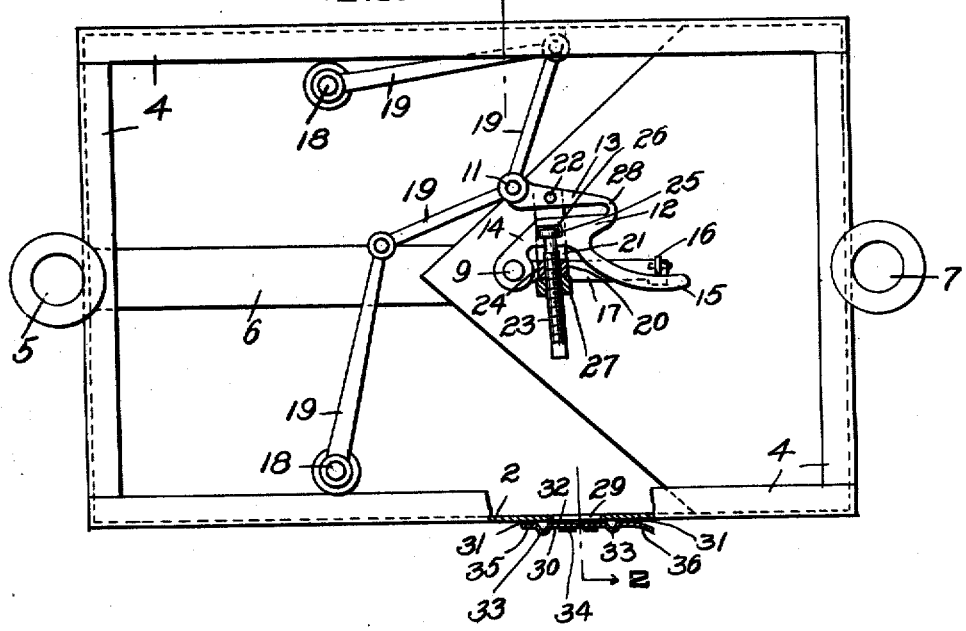
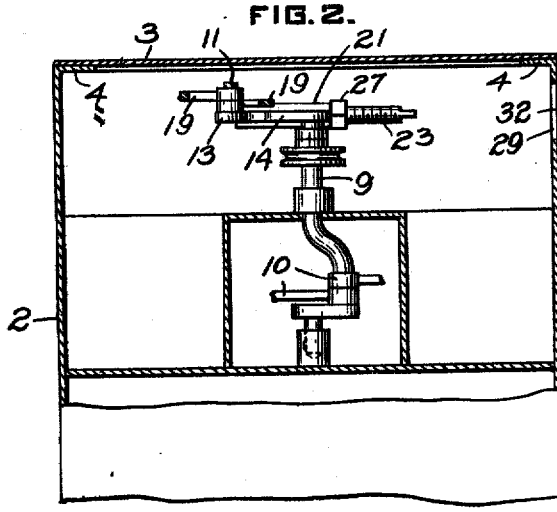
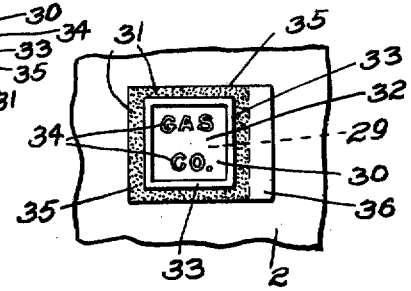
WITNESSES
J. Hobart Bradley.
Lois Wineman.
INVENTOR
J. R. Armstrong
by W. G. Doolittle
Attorney

UNITED STATES PATENT OFFICE.

JAMES R. ARMSTRONG, OF PITTSBURGH, PENNSYLVANIA.

GAS-METER.

1,342,886.   Specification of Letters Patent.   Patented June 8, 1920.

Application filed December 9, 1919. Serial No. 343,468.

*To all whom it may concern:*

Be it known that I, JAMES R. ARMSTRONG, a citizen of the United States, residing at Pittsburgh, in the county of Allegheny and State of Pennsylvania, have invented certain new and useful Improvements in Gas-Meters, of which the following is a specification.

My invention relates to improvements in gas meters, and more particularly to meters commonly and commercially known as tin or tin casing gas meters.

In meters of this character as heretofore constructed, the working parts of the meter are inclosed within a tightly closed casing, said casing including a top or cover plate soldered to the upper end of the casing, thereby preventing access to the interior of the casing except by the removal of the soldered top or cover.

While in service, it is not the intention to have the working parts accessible to the user. In testing the meter, however, to determine its accuracy, which it is customary to do after the meter has been in service for some time, it is necessary to have access to the interior of the casing. This has heretofore been accomplished by removing the soldered top or cover from the casing. The removal of this soldered top or cover requires considerable time and labor, and as it is necessary to apply heat, the meter is heated to such an extent that it is impossible to make the required test until it has cooled, thus wasting considerable time.

In the embodiment of my invention as shown by the drawings, I show a rotatable crank shaft and a tangent post construction in combination with adjusting means for varying the position of the tangent post relatively to the said shaft to effect an accurate operation of the meter. A construction of a somewhat similar character is shown in U. S. Letters Patent No. 1,212,729, granted to me January 16, 1917.

An object of the present invention is to provide a gas meter of the tin or tin-casing type with simple and efficient adjusting means for varying the position of the tangent post of the meter mechanism relatively to its crank shaft, and also to provide means whereby access may be had to said adjusting means without removing the soldered top or cover.

A further object of my invention is to form the casing of a tin meter with an opening in line with meter adjusting mechanism and to provide a simple and efficient detachable cover or closure for said opening, whereby, upon removal of the closure, access may be had to the interior of the casing and to the adjusting mechanism without removing the cover of the casing.

In the acompanying drawings which illustrate an application of my invention,

Figure 1 is a top plan view of a tin-casing meter with the cover, top plate or wall removed;

Fig. 2, a vertical sectional view, the section being taken on line 2—2 of Fig. 1; and Fig. 3, a detail view showing a portion of the tin-casing formed with an opening and a cover or closure for the opening.

Referring to the drawings, 2 designates the casing of a tin-casing gas meter, and 3 a top plate or cover fixedly secured to and constituting a wall of the gas tight casing. In practice, this top plate 3 is soldered to the upper edges of the casing or to the inturned flanges 4. Gas is introduced to the meter through inlet pipe 5, and passes to the valves, measuring pockets, etc., (not shown,) through passage 6, and out of the meter through the discharge outlet 7. I deem it unnecessary to fully show and describe herein all of the parts and the arrangement thereof of a meter structure, for the parts, other than those shown, are well known to those skilled in this art, and are not a part of the present invention. Some parts of the meter mechanism are more particularly described in the above referred to patent than herein. As shown, 9· designates a crank-shaft, and 10 links connected with said shaft and with the valves, not shown.

The adjusting means for varying the position of the tangent post 11 relatively to the actuating crank shaft 9 includes a member or element 12 carried by shaft 9. Said element comprises a tangent arm 13 on which the tangent post 11 is mounted, an arm or support 14 spaced from and flexibly connected to arm 13, and a striker arm 15, the latter being adapted, during its travel, to make contact with a gravity latch 16 supported at one end of an arm 17. Latch 16 arranged in the path of the arm 15, is designed to prevent the meter from running backward. 18 designates flag rods and extending from each flag rod are jointed arms 19, these arms or links having their ends connected to the tangent post.

For adjusting the arm 13·relatively to arm 14, and consequently the post 11 relatively to the shaft 9, I employ a screw adjustment comprising a casing 20, slotted at 21 to receive arm 14, said casing being secured at one end to arm 13, as indicated at 22. Adapted for coöperation with the casing is a threaded stem 23, the threaded portion thereof engaging an internally threaded portion 24 of the casing. Stem 23 is also provided with a swivel head 25 designed to engage the walls of a slot 26 of arm 14 and with a lock nut 27. Member 12, between arms 13 and 14, has a bend or loop portion 28 which is adapted to flex when tangent arm 13 is moved toward and from arm 14.

From this construction, it will be noted that when the screw stem is manipulated to contract the space between the arms 13 and 14, the resulting movement draws the tangent post toward the crank-shaft and when the space between the arms is enlarged, the movement carries the post away from said shaft, thereby permitting an adjustment of the tangent post relatively to the crankshaft.

At some suitable point preferably in a side wall of the casing, I form a tool receiving opening 29, this opening 29 being preferably placed in line with the actuating stem 23 when the latter is stopped from rotating by the engagement of arm 15 with latch 16.

It will be understood that, owing to the thin material of which the casing is formed, namely, of relatively thin sheet tin, it would be impracticable to employ a closure of the character employed with cast iron meters; further, that the closure should be of such a character that it will tightly close the opening; a closure which, if removed by an unauthorized person, will be brought to the attention of the gas company, and one that may be readily removed by an employee of the gas company when it is desired to test the meter.

The closure 30, as illustrated and as preferred, is made of tin or other suitable relatively thin material, and is provided with flat contacting edges 31, a body portion 32, a raised bead 33, raised characters 34, and an extension 36, the latter constituting a free end of the closure. 35 designates solder employed for securing the edges 31 to the outer surface of the casing adjacent the opening 29.

When it is desired to remove the closure, a suitable tool, not shown, adapted to engage the free slightly outstanding end 36, is applied thereto and in turning said tool, the closure is wound thereon and severed from the casing. It will be noted that in this operation, the characters and the bead 33 will be destroyed.

What I claim is:

1. The combination with a closed tin-casing gas meter having a tool receiving opening in a wall thereof, a crank shaft, a tangent post adjustable relatively to the crank shaft, post adjusting means accessible through the casing opening, and a detachable cover for said opening having a portion soldered to the exterior portion of said wall and a free end portion, adapted to be engaged to remove the closure.

2. The combination with a closed tin-casing gas meter having an opening in a wall thereof, of a detachable closure for said opening, said closure having a portion soldered to the exterior portion of said wall and a free end portion, adapted to be engaged to remove the closure.

3. The combination with a closed tin-casing gas meter having an opening in a wall thereof, of a detachable closure for said opening formed of sheet metal, said closure having a portion soldered to the exterior portion of said wall and a free unsoldered portion, adapted to be engaged to remove the closure.

4. The combination with a closed tin-casing gas meter having an opening in a wall thereof, of a detachable closure for said opening, said closure made of sheet metal and including edge portions adapted to be soldered to the casing, a raised portion, and a free end adapted to be engaged to remove the closure.

In testimony whereof I affix my signature in presence of two witnesses.

JAMES R. ARMSTRONG.

Witnesses:
J. M. GEOGHEGAN,
LOIS WINEMAN.